United States Patent [19]

Tanisaki et al.

[11] Patent Number: 5,399,832
[45] Date of Patent: Mar. 21, 1995

[54] PROCESS AND APPARATUS FOR USING ATMOSPHERIC-PRESSURE PLASMA REACTIONS

[75] Inventors: Tatsuzo Tanisaki, Onomichi; Satiko Okazaki, No. 20-11, Takaidohigashi 2-chome, Suginami-ku, Tokyo; Masuhiro Kogoma, No. 843-15, Shimoniikura, Wako-shi, Saitama-ken, all of Japan

[73] Assignees: Kimoto Co., Ltd., Tokyo, Japan; Kimoto Tech, Inc., Cedartown, Ga.; Satiko Okazaki, Tokyo; Masuhiro Kogoma, Saitama, both of Japan

[21] Appl. No.: 923,444

[22] Filed: Aug. 3, 1992

[30] Foreign Application Priority Data

Aug. 5, 1991 [JP] Japan .................................. 3-218035

[51] Int. Cl.⁶ .............................................. B23K 10/00
[52] U.S. Cl. ........................... 219/121.47; 219/121.43; 219/121.59; 219/121.48; 219/121.52; 75/346; 75/10.19
[58] Field of Search ...................... 219/121.59, 121.43, 219/121.41, 121.52, 121.48, 121.47; 75/346, 10.19; 204/298.31; 315/111.21, 111.51, 111.81

[56] References Cited

U.S. PATENT DOCUMENTS

| | | | |
|---|---|---|---|
| 4,162,914 | 7/1979 | Cremer | 75/346 |
| 4,423,303 | 12/1983 | Hirose et al. | 219/121.43 |
| 4,803,332 | 2/1989 | Koyama et al. | 219/121.52 |
| 4,812,166 | 3/1989 | Saiki et al. | 75/346 |
| 4,999,215 | 3/1991 | Akagi et al. | 427/41 |
| 5,124,173 | 6/1992 | Uchiyama et al. | 427/38 |
| 5,126,164 | 6/1992 | Okazaki et al. | 437/39 |

*Primary Examiner*—Mark H. Paschall

[57] ABSTRACT

A grounded electrode and a high-voltage applying electrode, each obtained by covering a metal electrode with a dielectric are housed at least within a reactor apparatus. A rare gas can be introduced in the apparatus by way of a gas delivery tube, and a monomer gas can be admitted in the apparatus by way of a gas delivery tube. An additional gas may also be introduced in the apparatus by way of a gas delivery tube. The employed gases may be discharged from within the reactor by way of a discharge tube. Powders are charged in the apparatus with a rare gas, monomer gas, or combination thereof and, optionally, additional gases may be included, the gas components being selected based upon what type of electrical power is to be treated. Powers ape supplied to the electrodes to induce atmospheric-pressure plasma reactions, thereby modifying or enhancing the characteristics of the powders.

12 Claims, 1 Drawing Sheet

PROCESS AND APPARATUS FOR USING ATMOSPHERIC-PRESSURE PLASMA REACTIONS

BACKGROUND OF THE INVENTION

1. Field of the Invention

The present invention relates generally to a process and apparatus for making use of atmospheric plasma reactions and, more specifically, to a process and apparatus for making use of atmospheric-pressure plasma reactions capable of modifying the surface of powder through use of a very stable discharge plasma, at atmospheric pressure, with high efficiency.

2. Statement of the Prior Art

As generally well-known in the art, plasma is a gas in which there are positive ions and free negative electrons and therefore is electrically neutral, and that plasma differs from a neutral gas in properties. Such a plasma may be artificially obtained by gas discharge.

Incidentally, it is well-known that plasma may be applied to forming films, making use of low-pressure glow discharge plasma, or to surface modification or denaturation, and so are widely used in various industrial fields. One typical surface treatment using a low-pressure glow discharge plasma is a so-called organic plasma technique, in which thin-film making and surface modification or denaturation are achieved by making use of an organic compound gas plasma. In addition, it has been proposed to make use of plasma in a vacuum vessel to produce diamond powders or ultrafine powders or to achieve surface modification or denaturation.

Problems with such conventional surface treatments using low-pressure glow discharge plasma, however, include the requirement for low-pressure vacuum equipment and like other installation due to reactions taking place at as low as $10_{-5}$ to $10^{-}$Torr, as well as the large amount of time and high production costs required due to discontinuous (batch) treatments.

Problems associated with the surface treatment of powders, etc. include complicated equipment, much treating time, and troublesome processing steps requiring the need for waste water disposal, because the surfaces of pigments are wet-treated with resins, acids, alkalis, and solution aerosols containing surface active agents, etc.

In view of the problems mentioned above, it is therefore an object of this invention to provide a process and apparatus for making use of atmospheric-pressure plasma reactions which are of so increased reactivity at atmospheric pressure that the surfaces of large amounts of powders can be treated inexpensively in a gas phase, making use of a reaction gas plasma of great stability.

SUMMARY OF THE INVENTION

According to one aspect of this invention, the object mentioned above is achieved by the provision of a process for using an atmospheric-pressure plasma reaction, wherein powders are placed in a reactor vessel including a high-voltage applying electrode and a grounded electrode, each being constructed of a metal electrode with a dielectric covering over either the entire or partial metal surface. The reactor vessel is supplied with a rare gas, monomer gas, or combination thereof and electrical power is supplied to said high-voltage applying electrode and a grounded electrode to induce plasma excitation at atmospheric pressure, thereby treating the surface of said powders.

According to another aspect of this invention, there is provided a process for using an atmospheric-pressure plasma reaction, wherein powders are placed in a reactor vessel made up of a high-voltage applying electrode and a grounded electrode each constructed of a metal electrode with a dielectric covering over the entire or partial metal surface. The reactor vessel is supplied with a rare gas, monomer gas, or combination thereof, and an additional gas, and electrical power is supplied to said high-voltage applying electrode and a grounded electrode to induce plasma excitation at atmospheric pressure, thereby treating the surface of said powders.

Preferably, said additional gas may be a solvent gas, an organic or inorganic acid gas or complex thereof or an alkaline gas or a surfactant-containing solution aerosol.

According to the third aspect of this invention, there is provided an atmospheric-pressure reactor apparatus characterized by including in a reactor vessel for an atmospheric-pressure plasma reaction, a high-voltage applying electrode and a grounded electrode, each housed within said reactor vessel and each obtained by covering a metal electrode with a dielectric material, a gas delivery tube for introducing a rare gas into said reactor vessel, a gas delivery tube for introducing a monomer gas into said reactor vessel, a gas delivery tube for introducing an additional gas into said reactor vessel, and an exhaust gas pipe for discharging the employed gas or gases from said reactor vessel.

Preferably, the dielectric material covering the high-voltage applying electrode and the grounded electrode is liquid, solid, or a combination of both.

According to the first aspect of this invention, the rare gas and/or the monomer gas are introduced in the reactor vessel, which includes the grounded electrode and high-voltage applying electrode, each covered with the dielectric material, for their interaction, thereby generating a stable atmospheric-pressure plasma for the treatment of the surfaces of powders.

This enable the powders to be improved in terms of dispersibility, re-dispersibility, cohesiveness (agglomeration), anti-sedimentation, binding capability, kneadability and other factors.

According to the second aspect of this invention, the rare gas and/or the monomer gas are introduced in the reaction vessel which includes the grounded electrode and high-voltage applying electrode, each covered with the dielectric material, optionally with an additional gas such as a solvent gas, an organic acid, an inorganic acid or a surfactant-containing solution aerosol, for their interaction, thereby generating a stable atmospheric-pressure plasma for the treatment of the surfaces of powders.

This enable the powders to be improved in terms of dispersibility, re-dispersibility, cohesiveness (agglomeration), anti-sedimentation, binding capability, kneading capability and other factors.

According to the third aspect of this invention, the high-voltage applying electrode or grounded electrode is spirally wound to form one electrode, and an electrode of opposite polarity is covered with a dielectric material to form another electrode, which is in turn inserted centrally into the spiral electrode. These electrodes are then housed in the reactor vessel in which the rare and/or monomer gases are introduced, optionally together with the additional gas such as a solvent gas, an organic acid gas, an inorganic acid gas or a surfactant-containing solution aerosol which may be used alone or in admixture, thereby producing glow discharge plasma of high activity and great stability at atmospheric pressure for the treatment of the surfaces of powders.

This makes it possible to achieve the two treatments mentioned above. When these treatments are carried out with the apparatus mentioned above, the powders are primarily improved in terms of dispersibility, re-dispersibility, cohesiveness (agglomeration), anti-sedimentation, binding capability and kneadability, and are additionally much more improved in terms of their compatibility with respect to other material, thereby improving or enhancing their performance and function.

BRIEF DESCRIPTION OF THE DRAWINGS

The present invention will now be explained at great length but not exclusively with reference to the accompanying drawings, in which.

BEST MODE FOR CARRYING OUT THE INVENTION

Figure 1:
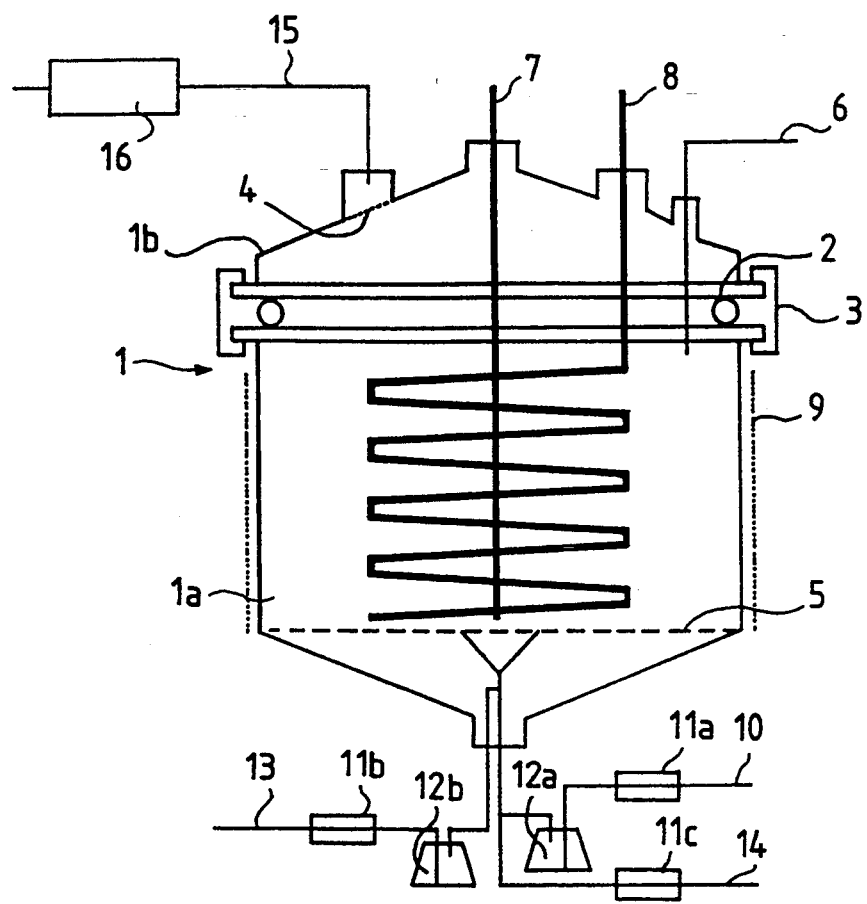
FIG. 1 represents the construction of one embodiment of the atmospheric-pressure plasma reactor apparatus.

Referring now to FIG. 1, there is schematically shown the construction of one embodiment of the atmospheric-pressure reactor apparatus according to this invention.

As illustrated, a reactor vessel 1, typically a bell-jar type reactor built up of pyrex, includes lower and upper units 1a and 1b which are detachable from each other. For use, the upper unit 1b may be jointed onto the lower unit 1a by means of a clamp 8 with an O-ring 2 located between them. Within the reactor apparatus 1, the upper unit 1b is locally provided with a filter 4 for preventing an undesired escape of powders. In addition, the lower unit 1a is provided on its bottom with a mesh 5 which enables the powders to be easily scattered up and prevents them from remaining stagnant on the bottom, giving rising to some inconvenience. The reactor apparatus 1 is connected with a vacuum evacuation pipe 6, so that when it is required to remove air, etc. from the interior of the reactor apparatus 1 or the powders while it is used, air, etc. can be evacuated from the vacuum evacuation pipe 6 to obtain a degree of vacuum in a matter of $10^{-3}$ Torr. Note that when a trap is needed for the vacuum evacuation pipe 6, it may be located between the vacuum evacuation pipe 6 and a vacuum pump (not shown).

At the center of the interior of the reactor apparatus 1, there is located a linear form of grounded electrode 7, around which a high-voltage applying electrode 8 is mounted in a spiral form. Around the lower unit 1a of the reactor apparatus 1 there is mounted a grounded electrode 9. Note that the grounded electrode 7, high-voltage applying electrode 8 and grounded electrode 9, even if opposite in polarity, are well discharged, but the polarity mentioned above is preferred. While the grounded electrode 9 may be in a spiral form, it is understood that better results are obtained by forming it from a metal gauze such as stainless and, possibly, laminating with dielectrics on both sides thereof, Usable to this end may be glass, ceramics, plastics or other dielectric materials. Alternatively, it may be coated with insulating oil. Still alternatively, various rubber materials kneaded with insulating oil or cross-linked, vulcanized rubber materials may be used for this purpose as well. As a matter of course, an electrode may be used, obtained by impregnating a substrate with insulating oil and winding it around an electrically conductive metal. It is also possible to use an electrode obtained by inserting a metal electrode into a pipe with insulating oil poured in it. This prevents deformation or destruction of the solid dielectric as by thermal strain when the electrode portions generates heat, enables a circulation type cooler to be used using insulating oil, makes it possible to control the generation of heat from the electrode portions, and prevents glow discharge from passing into arc discharge accompanying an increase in the temperature of the substrate. The use of the liquid dielectric makes it easy to enlarge the areas of the discharge electrode portions, and gives rise to some merits such as the ease with which processings and production are achieved.

The rare gas feed pipe 10 is connected to the bottom of the reactor apparatus 1 by way of a flow meter 11a and a bubbler 12a, while the additional gas feed pipe 13 is joined to the bottom of the reactor apparatus 1 by way of a flow meter 11b and a bubbler 12b. These Pare and additional gas feed pipes 10 and 13 enables either a gas or a gas mixture to be fed. As is the case with the pipes 10 and 13, the monomer gas feed pipe 14 is connected to the bottom of the reactor apparatus 1 by way of a flow meter 11c, so that either a gas or a gas mixture can be fed from the rare and monomer gas feed pipes 10 and 14. The gases fed from the rare, additional and monomer gas feed pipes 10, 13 and 14 are regulated by the flow meters 11a, 11c and 11c in terms of the rates of flow for introduction into the reactor apparatus 1.

The upper unit 1b of the reactor apparatus 1 is connected with an exhaust gas 15, which is provided with a filter 16 on its way. With this exhaust gas pipe 15, the filter 16 is preferably of the size that can pass the exhaust gas but cannot pass the powders, say, 0.01 to 250 $\mu$m. In particular, preference is given to 0.1 to 50 $\mu$m. When a rare gas such as He gas is recycled in the reactor apparatus 1, it is desired that the filter 4 used lies in the size range of 0.01 to 5 $\mu$m.

It is noted that a powder sample is located at the central region of the mesh 5 and is then diffused throughout the reactor apparatus 1 together with the fed gas.

In the ensuing description, the structures of the grounded electrode 7 and high-voltage applying electrode 8 will be described with reference to FIGS. 2 and 3.

Figure 2:
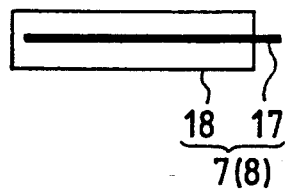
FIG. 2 illustrates the construction of one embodiment of the Grounded and high-voltage applying electrodes used in that embodiment.

FIG. 2 illustrates the specific structure of the grounded or high-voltage applying electrode 7 or 8 used in the reactor apparatus 1.

Referring now to FIG. 2, the electrode 7 or 8 is made up of a metal electrode 17 coated with a dielectric covering material 18 therearound. It is here noted that the dielectric covering material used, for instance, may be glass, ceramics and plastics.

Figure 3:
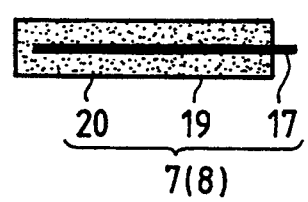
FIG. 3 illustrates the construction of another embodiment of the grounded and high-voltage applying electrodes used in that embodiment.

FIG. 3 is an illustrative representation of the specific structure of the grounded or high-voltage applying electrode 7 or 8 for which the liquid dielectric is used.

Referring now to FIG. 3, the grounded or high-voltage applying electrode 8 is built up of a metal electrode 17 housed in a container 19, which is filled with a liquid dielectric 20. Usable as the liquid dielectric 20, for instance, may be a hydrocarbon type synthetic insulating oil represented by alkylbenzene, polybutene and diphenyl pentachloride, chlorinated synthetic oil, mineral oil, silicone oil and fluorine oil, which may be used alone. When they are used alone, the metal of which the metal electrode 17 is formed may include alloys of aluminium, magnesium, tin, zinc or nickel or stainless steel rather than copper.

It is noted that the liquid dielectric 20 provided around the metal electrode 17 forming part of the electrode 7 or 8 may be impregnated in a suitable substrate. It is also noted that the liquid dielectric 20 may be kneaded with other resin or rubber, or alternatively may be formed into a film by curing by cross-linking. When the power applied is relatively low, rubber type materials such as high-density polyethylene, nitrile rubber and urethane rubber are easy to handle.

A cross-linked type polyvinyl alcohol or polyvinyl acetal may be used as well.

Practically, the container may be formed of pyrex glass, alumina type ceramics, barium titanate type ceramics or other materials. For instance, the grounded or high-voltage applying electrode 8 may be formed by sealing silicon (SF96 made by GE Co., Ltd.) in the container 19 constructed from a pipe of heat-resistant glass such as pyrex glass.

In what follows, how to excite plasma discharge in the reactor apparatus 1 of the structure mentioned above will be explained in detail.

First, the gas introduced in the reactor apparatus 1 is a factor important for stabilizing atmospheric-pressure glow discharge, as mentioned below in detail.

The rare gases used may include helium (He), neon (Ne), argon (Ar), nitrogen ($N_2$) and the like.

The monomer gases used may include unsaturated hydrocarbons and hydrocarbons which may or may not contain halogens or other functional groups. In particular, hydrocarbons containing halogen functional groups, for instance, include $CF^4$, $C_2F_4$, $C_3F_8$ and $(CH_3)_3B$.

The solvents generating gases used as the additional gases may include hydrocarbons, halogenated hydrocarbon, alcohols, ethers, acetals, ketones, esters, polyhydric alcohols and their derivatives, fatty acids, phenols, nitrogen compounds, sulfur compounds, phosphorus compounds and other compounds, and inorganic solvents. While the additional gas may be optionally selected from the solvents mentioned above depending upon what type of powder is used, these solvent gases may be used alone or in combination of two or more. The organic acids used as the additional gas, for instance, may be carboxylic acids (RCOOH), sulfonic acids ($RSO_3H$), sulfinic acids ($RSO_2H$), phenols (ArOH), enols (RCH=C(OH)R), thiophenols (ArSH), imides (RCOHNCOR), oxims (RCHONOH), aromatic sulonamides ($ArSO_2$—$NH_2$) and nitro compounds ($RCH_2NO_2R_2CHNO_2$). However, preference is given to formic acid, maleic acid and fumaric acid which may be used alone, or dissolved in solvents such as as water and alcohols. The inorganic acids used may include hydrochloric acid, sulfuric acid, phosphoric acid, nitric acid and other acids.

The surfactant-containing solution aerosol used as the additional gas may include these based on cations, anions, nonions, silicon, fluorine, fluorocarbons, hydrocarbons, fatty acids, amides, esters, alcohols and metal soaps, which may be used alone or dissolved in water or suitable solvents.

The amount of the additional gas to be added lies in the range of 0.001 ppm to 50%, preferably 0.01 ppm to 5%.

In the following description, the powders that can be treated according to this invention will be explained.

The organic powders that can be treated according to this invention, for instance, include organic pigments, organic dyes, starch and protein powders, fatty powders, hydrocarbon powders, vitamin powders, oxygen powders, fine resin powders, finely divided carbonized organic powders, cellulose and its derivative powders. Referring particularly to the organic pigments, they possibly include (a) neutral nitro type pigments such as, azo type, anthraqinone type, phthalocyanine type and azine type pigments, (b) cation type pigments such as triphenylmethane and xanthene type pigments, (c) anion type pigments such as azo and triphanol pigments, (d) other pigments such as anthraquinone, dioxazine and quinacridone type pigments, and (e) carbon black (bone black). Included in the organic dyes, on the other hand, are azo, azometal composite, azomethine, dialylide, monoazo, anthanthrone, pyranthrone, perione, isoindolinone, quinophthalone, anthrapyridine, phthalocyanine, indanthrone, Nigrosine, perinone, quinoline, coumarin and thioindigo type dyes.

The inorganic powders that can be treated with this invention will now be explained. Included in the inorganic powders, for instance, are white pigments constituted by inorganic compounds such as calcium carbonate ($CaCO_3$), titanium oxide ($TiO_2$), zinc oxide (ZnO), silicon dioxide ($SiO_2$), talc, calcium oxide (CaO), calcium oxide (CaO), calcium phosphate, apatite, materials formed of colored transition elements, vanadium (V), chromium (Or), manganese (Mn), iron (Fe), cobalt (Co), nickel (Ni), molybdenum (Mo), tungsten (W), mercury (Hg), lead (Pb) and antimony (Sb), pigments and finely divided metals containing sulfur (S) and selenium (Se).

Furthermore, the powders of primary minerals may be treated according to this invention, including those of (a) orthosilicates such as muscovite, biotite, epidote and zircon, (b) metasilicates such as tramolite, (c) polysilicates such as orthoclase, alibite, anorthite and plaginoclase, (d) oxides such as quartz, magnetite and limenite, (f) phosphates such as apatite and (g) carbonates such as limestone.

In addition, the powders of secondary minerals that can be treated with this invention, for instance, includes those of clay minerals, kaolinite, halloysite, hydrated halloysite, illite, vermiculate, montmorillonite, hiddenite, nonlonite, savonite, chlorite, attapulgite, gibbsite, hematite, getite, limonite, pyrolusite and allophen.

The powders of ceramics that can be treated according to this invention, for instance, include those of metal oxides such as barium titanate ($BaTiO_3$), aluminium oxide ($Al_2O_3$), zinc oxide (ZnO), silicon oxide ($SiO_2$), zirconium oxide ($ZrO_2$), beryllium oxide (BeO) and thorium oxide ($ThO_2$); PLZT; ferrite; chalcogens; oxide glass; rare earth cobalt; and their multiphase ceramics.

The powders of nonoxides that can be treated according to this invention, for instance, include those of carbon, silicon carbide (SIC), titanium carbide (TIC), boron nitride (BN), cadmium sulfide (CdS) and their multiphase ceramics.

The powders of cement that can be treated according to this invention, for instance, include those of Portland cement, magnesia cement, alumina cement and silica cement.

In the process, a suitably metered amount of the powders mentioned above is charged or introduced in the lower unit 1a of the reactor apparatus 1 with the upper unit 1b removed from it, and the upper unit 1b is attached and jointed to the lower unit 1a by means of the clamp 3.

While the required gases are introduced into the reactor apparatus 1 by way of the rare, additional and monomer gas feed pipes 10, 13 and 14, voltages are applied to the grounded, high-voltage applying and grounded electrodes 7, 8 and 9 for atmospheric-pressure treatment.

In what follows, the first treatment of this invention will be explained.

Two (2) grams of the silica powders to be treated were charged in the reactor apparatus 1. Then, while a rare gas—helium (He)—was supplied into the reactor apparatus 1 through the rare gas feed pipe 10 at a flow rate of 1000 ml/min., voltages were impressed on the grounded, high-voltage applying and grounded electrodes 7, 8 and 9 for a 10-minute atmospheric-pressure plasma treatment. In this case, the dielectric materials used for the electrodes 7, 8 and 9 were PE, and a.c. voltages were applied to the electrodes 7, 8 and 9 at a frequency of 23 kHz. At this time, the firing power was 150 W.

The results of the atmospheric-pressure treatment carried out as mentioned above were estimated as follows.

For the estimation of dispersibility, 0.2 grams of the treated silica powders were placed along with 20.0 ml of distilled water in a dispersing bottle for dispersion with a paint shaker. For determining the rate of dispersing sedimentation, 0.2 grams of the treated silica powders were dispensed along with 20.0 ml of MEK (methyl ethyl ketone) for dispersion with a paint shaker. Ten (10) minutes after dispersion with no addition of any media, a part of the dispersion was removed and dispensed in a quartz cell for determining the rate of sedimentation with a ultraviolet spectrometer and a visible spectrometer. It was noted that the vehicle of good dispersibility is generally slow in terms of the rate of sedimentation of the pigment and shows a relatively low transmittance. The higher the rate of sedimentation, the larger the transmittance of the supernatant with the lapse of. Thus, the transmittance was measured with the lapse of time for determining the rate of sedimentation. Since the transmittance varies depending upon the size, specific gravity and other factors of powders, relative comparison was made between the same powders.

It is noted that the transmittance varies with the types of pigments and solvents, and so transmittance was determined at intervals of 9 minutes, 30 minutes and 90 minutes. The transmittance values are indicated in terms of time lengths at a wavelength of 700 $\mu$m.

The cohesiveness (agglomeration) of a powder sample was investigated in the dispersion after sedimentation. In addition, the re-dispersibility of a powder sample was investigated by shaking the dispersion after sedimentation.

Similarly, untreated—control—silica powders were measured for the same properties, using the dispersion.

For the estimation of to what extent sample powders were well kneaded together, a full 0.5 grams of untreated or treated powders were kneaded with 10 grams of a solution of acrylonitrile rubber (20%) pre-dissolved in MEK to measure the particle size with the use of a grind gauge. When compared with the control, the powders treated with helium (He) was found to be well dispersed or re-dispersed, agglomerated and kneaded in the water dispersions.

The results of these estimations are set out together with the treating conditions in Table 1.

TABLE 1

| | HOW TO DISCHARGE | |
|---|---|---|
| Powders | Control Silica | Treated Silica |
| Rare Gas | — | He |
| Flow Rate (ml/min.) | | (2000) |
| Monomer Gas | — | — |
| Flow Rate (ml/min.) | | |
| Additional Gas | — | — |
| Flow Rate (ml/min.) | | |
| Dielectric Material | — | PE |
| Frequency (kHz) | — | 23 |
| Firing Power (W) | — | 150 |
| Reaction Time (min.) | — | 10 |

| | HOW TO ESTIMATE | | | |
|---|---|---|---|---|
| Dispersibility | (A) | (B) | (A) | (B) |
| in Water A and Solvent B | Δ | X | ○ | — |
| Sedimentation Rate | 0.8 | 39 | 2 | |
| Re-dispersibility | Δ | Δ | ○ | |
| Cohesiveness | Δ | Δ | ○ | |
| Kneadability | Δ | Δ | ○ | |

In Table 1, the estimation of kneading (with a dispersed particle size ($\mu$m)—Hegmann Gauge) was made according to the following criteria: : 5, : 5–10, : 10–15 and x: 15–25. It is understood that this shall hold for Tables 2–7.

Reference will now be made to the second treatment of this invention.

As was the case with the first treatment mentioned above, the silica powders to be treated were charged in the reactor apparatus 1. Then, while 2000 ml/min. of a rare gas—helium (He)—was supplied into the reactor apparatus 1 through the rare gas feed pipe 10 and 2000 ml/min. of a monomer gas ($CF_4$) was admitted in the reactor apparatus 1 by way of the feed pipe 14, voltages were impressed on the grounded, high-voltage applying and grounded electrodes 7, 8 and 9 for a 10-minute atmospheric-pressure plasma treatment. In this case, the dielectric materials used for the electrodes 7, 8 and 9 were all PE, and a.c. voltages were applied to the electrodes 7, 8 and 9 at a frequency of 25 kHz. At this time, the firing power was 150 W.

The results of estimation of the atmospheric-pressure plasma treatment carried out as mentioned above are set out together with the treating conditions in Table 2.

A full 0.2 grams of the treated silica powders were placed in a dispersing bottle with the addition of distilled water and MEK (20.0 ml) for the same dispersion as in the first treatment, thereby making estimation. As can be seen from Table 2, the powders treated with $CF_4$ were found to be well dispersed or re-dispersed, agglomerated and kneaded in the solvent and MEK; this is in contrast to the first treatment of this invention.

TABLE 2

| HOW TO DISCHARGE |
|---|

TABLE 2-continued

| Powders | Control Silica | Treated Silica |
|---|---|---|
| Rare Gas | — | He |
| Flow Rate (ml/min.) | | (2000) |
| Monomer Gas | — | — |
| Flow Rate (ml/min.) | | |
| Additional Gas | — | |
| Flow Rate (ml/min.) | | |
| Dielectric Material | — | PE |
| Frequency (kHz) | — | 23 |
| Firing Power (W) | — | 150 |
| Reaction Time (min.) | — | 10 |
| HOW TO ESTIMATE | | | | |
| Dispersibility | (A) | (B) | (A) | (B) |
| in Water A and Solvent B | Δ | X | X | ○ |
| Sedimentation Rate | 0.8 | 39 | 43 | 37 |
| Re-dispersibility | Δ | Δ | X | ○ |
| Cohesiveness | Δ | Δ | X | ○ |
| Kneadability | Δ | Δ | x | ○ |

Reference will now be made to the third treatment of this invention.

Following the first treatment of this invention already mentioned, the silica powders to be treated were fed in the reactor apparatus 1. While 2000 ml/min. of a rare gas (He) was introduced into the reactor apparatus 1 by way of the feed pipe 10, formic acid was admitted as the additional gas into the reactor apparatus 1 by bubbling through the feed pipe 13. Then, voltages were impressed on the grounded, high-voltage applying and grounded electrodes 7, 8 and 9 for a 10-minute atmospheric-pressure plasma treatment. In this case, the dielectric materials used for the electrodes 7, 8 and 9 were glass vessels 19 each filled therein with a liquid dielectric 20, and a.c. voltages were applied to the electrodes 7, 8 and 9 at a frequency of 28 kHz. At this time, the firing power was 75 W.

The results of estimation of the atmospheric-pressure plasma treatment carried out as mentioned above are set out together with the treating conditions in Table 3.

As can be appreciated from Table 3 showing the results of the dispersion of the powders in distilled water and MEK done following the first treatment already mentioned, they were found to be well dispersed or re-dispersed, agglomerated and kneaded in MEK.

TABLE 3

| HOW TO DISCHARGE | | |
|---|---|---|
| Powders | Control Silica | Treated Silica |
| Rare Gas | — | He |
| Flow Rate (ml/min.) | | (2000) |
| Monomer Gas | — | — |
| Flow Rate (ml/min.) | | |
| Additional Gas | — | Formic Acid |
| Flow Rate (ml/min.) | | |
| Dielectric Material | — | Glass, Liquid Dielectric |
| Frequency (kHz) | — | 28 |
| Firing Power (W) | — | 75 |
| Reaction Time (min.) | — | 10 |
| HOW TO ESTIMATE | | | | |
| Dispersibility | (A) | (B) | (A) | (B) |
| in Water A and Solvent B | Δ | X | X | ○ |
| Sedimentation Rate | 0.8 | 39 | 1.4 | 1.6 |
| Re-dispersibility | Δ | Δ | Δ | ○ |
| Cohesiveness | Δ | Δ | Δ | ○ |
| Kneadability | Δ | Δ | Δ | ○ |

Further, plasma discharge was done with the grounded and high-voltage applying electrodes 7 and 8, each built up of the aluminium electrode 17 as shown in FIG. 3 and the glass tube 19 filled therein with the liquid dielectric 20—silicone oil (SF996-100, made by GE). As a result, uniform glow discharge was attained in a stable manner.

Still further, a 30-minute continuous treatment was attempted with a voltage resulting in a firing power of 200 W. Consequently, it was noted that stable glow discharge was maintained. From the fact that the electrodes 7, 8 and 9 generated no heat after the completion of discharge, it was also understood that the liquid dielectric can exert some cooling effect. Thus, the use of the liquid dielectric in combination with the high-output plasma treatment is very convenient, because it is possible to apply continued cooling to the liquid dielectric itself with the use of a circulation type cooling device, thereby preventing glow discharge from passing into arc discharge. To add to this, for the grounded or high-voltage applying electrode 7 or 8 of the configuration mentioned above, there is no need of laminating a solid dielectric to the solid electrode; that is, stabilized glow discharge can be attained over an extended period of time without any destruction which may otherwise be caused by a difference in the coefficient of thermal expansion, as observed between metal and glass or the like.

Reference will now be made to the fourth treatment of this invention.

Following the first treatment of this invention already mentioned, the silica powders to be treated were fed in the reactor apparatus 1. While 2000 ml/min. of a rare gas (He) was introduced into the reactor apparatus 1 by way of the feed pipe 10, a 1% aqueous solution of fluorocarbon—$EC_{431}$ made by MMM—was admitted as the additional gas into the reactor apparatus 1 by He gas bubbling through the feed pipe 13. Then, voltages were impressed on the grounded, high-voltage applying and grounded electrodes 7, 8 and 9 for a 10-minute atmospheric-pressure plasma treatment. In this case, the dielectric materials used for the electrodes 7, 8 and 9 were all PE, and a.c. voltages were applied to the electrodes 7, 8 and 9 at a frequency of 24 kHz. At this time, the firing power was 75 W.

The results of estimation of the atmospheric-pressure plasma treatment carried out as mentioned above are set out together with the treating conditions in Table 4.

As can be appreciated from Table 4 showing the results of the dispersion of the powders in distilled water and MEK done following the first treatment already mentioned, they were found to be well dispersed or re-dispersed, agglomerated and kneaded in MEK.

For investigating the dispersion of the treated silica powders, they were dispersed in distilled water and MEK as in Example 1. Table 4 also indicates that they are well dispersed or re-dispersed, agglomerated and kneaded in MEK.

TABLE 4

| HOW TO DISCHARGE | | |
|---|---|---|
| Powders | Control Silica | Treated Silica |
| Rare Gas | — | He |
| Flow Rate (ml/min.) | | (2000) |
| Monomer Gas | — | — |
| Flow Rate (ml/min.) | | |
| Additional Gas | — | Fluorocarbon |
| Flow Rate (ml/min.) | | |

TABLE 4-continued

| Dielectric Material | — | PE |
|---|---|---|
| Frequency (kHz) | — | 24 |
| Firing Power (W) | — | 75 |
| Reaction Time (min.) | — | 10 |

| HOW TO ESTIMATE | | | | |
|---|---|---|---|---|
| Dispersibility | (A) | (B) | (A) | (B) |
| in Water A and | Δ | | X | |
| Solvent B | | X | | — |
| Sedimentation Rate | 0.8 | 39 | 1.2 | 21.1 |
| Re-dispersibility | Δ | Δ | Δ | ○ |
| Cohesiveness | Δ | Δ | Δ | ○ |
| Kneadability | Δ | Δ | Δ | ○ |

Reference will now be made to the fifth treatment of this invention.

Following the first treatment of this invention already mentioned, 2 grams of the carbon black powders to be treated were fed in the reactor apparatus 1. Then, while a rare gas—helium (He)—was supplied into the reactor apparatus 1 through the rare gas feed pipe 10 at a flow rate of 2000 ml/min., voltages were impressed on the grounded, high-voltage applying and grounded electrodes 7, 8 and 9 for a 10-minute atmospheric-pressure plasma treatment. In this case, the dielectric materials used for the electrodes 7, 8 and 9 were all PE, and a.c. voltages were applied to the electrodes 7, 8 and 9 at a frequency of 22 kHz. At this time, the firing power was 75 W.

A full 0.2 grams of the thus treated carbon black powders were placed in a dispersing bottle with the addition of 20.0 ml of distilled water, followed by a 10-minute dispersion with a paint shaker. The measurements were found following the first treatment of this invention. At the same time, control carbon black was similarly treated for the purpose of comparison.

These measurements are reported in Table 5, from which it is noted that the He-treated carbon black was much more improved in terms of dispersibility, re-dispersibility, cohesiveness (agglomeration) and kneadability than the control carbon black.

TABLE 5

| HOW TO DISCHARGE | | |
|---|---|---|
| Powders | Carbon Black | Carbon Black |
| Rare Gas | — | He |
| Flow Rate (ml/min.) | | (2000) |
| Monomer Gas | — | — |
| Flow Rate (ml/min.) | | |
| Additional Gas | — | — |
| Flow Rate (ml/min.) | | |
| Dielectric Material | — | PE |
| Frequency (kHz) | — | 22 |
| Firing Power (W) | — | 75 |
| Reaction Time (min.) | — | 10 |

| HOW TO ESTIMATE | | |
|---|---|---|
| Dispersibility | X | ○ |
| Sedimentation Rate | 42.1 | 7.1 |
| Re-dispersibility | Δ | ○ |
| Cohesiveness | Δ | ○ |
| Kneadability | X | ○ |

Reference will now be made to the sixth treatment of this invention.

Following the first treatment of this invention already mentioned, 2 grams of the carbon black powders to be treated were fed in the reactor apparatus 1. While 2000 ml/min. of a rare gas (He) was introduced into the reactor apparatus 1 by way of the feed pipe 10, methanol was admitted as the additional gas into the reactor apparatus 1 by He gas bubbling (6 ml/min.) through the feed pipe 13. Then, voltages were impressed on the grounded, high-voltage applying and grounded electrodes 7, 8 and 9 for a 10-minute atmospheric-pressure plasma treatment. In this case, the dielectric materials used for the electrodes 7, 8 and 9 were all PE, and a.c. voltages were applied to the electrodes 7, 8 and 9 at a frequency of 22 kHz. At this time, the firing power was 75 W.

The results of estimation of the atmospheric-pressure plasma treatment carried out as mentioned above are set out together with the treating conditions in Table 6.

Placed in a dispersing bottle were 0.2 grams of the treated carbon black with the addition of 20.0 ml of distilled water, followed by a 10-minute dispersion with a paint shaker. The subsequent treatments followed the first treatment of this invention already stated. As can be seen from Table 6, the carbon black was improved in terms of dispersibility, re-dispersibility, cohesiveness (agglomeration) and kneadability.

TABLE 6

| HOW TO DISCHARGE | | |
|---|---|---|
| Powders | Carbon Black | Carbon Black |
| Rare Gas | — | He |
| Flow Rate (ml/min.) | | (2000) |
| Monomer Gas | — | — |
| Flow Rate (ml/min.) | | |
| Additional Gas | — | Methanol |
| Flow Rate (ml/min.) | | (6) |
| Dielectric Material | — | PE |
| Frequency (kHz) | — | 22 |
| Firing Power (W) | — | 75 |
| Reaction Time (min.) | — | 10 |

| HOW TO ESTIMATE | | |
|---|---|---|
| Dispersibility | X | ○ |
| Sedimentation Rate | 42.1 | 18.1 |
| Re-dispersibility | Δ | ○ |
| Cohesiveness | Δ | ○ |
| Kneadability | X | ○ |

Finally, the seventh treatment of this invention will be explained.

Following the first treatment of this invention already mentioned, 2 grams of the apatite powders to be treated were fed in the reactor apparatus 1. While 2000 ml/min. of a rare gas (He) was introduced into the reactor apparatus 1 by way of the feed pipe 10, formic acid was admitted as the additional gas into the reactor apparatus 1 by He gas bubbling (6 ml/min.) through the feed pipe 13. Then, voltages were impressed on the grounded, high-voltage applying and grounded electrodes 7, 8 and 9 for a 10-minute atmospheric-pressure plasma treatment. In this case, the dielectric materials used for the electrodes 7, 8 and 9 were all glass, and a.c. voltages were applied to the electrodes 7, 8 and 9 at a frequency of 24 kHz. At this time, the firing power was 75 W.

The results of estimation of the atmospheric-pressure plasma treatment carried out as mentioned above are set out together with the treating conditions in Table 7.

Table 7 also indicates that the apatite treated with formic acid, when dispersed in MEK, is improved in terms of dispersibility, re-dispersibility, cohesiveness (agglomeration) and kneadability.

Table 7 refers to the estimation of untreated or control apatite powders as well.

TABLE 7

HOW TO DISCHARGE

TABLE 7-continued

| Powders | Apatite | | Apatite | |
|---|---|---|---|---|
| Rare Gas | — | | He | |
| Flow Rate (ml/min.) | | | (2000) | |
| Monomer Gas | — | | — | |
| Flow Rate (ml/min.) | | | | |
| Additional Gas | — | | Formic Acid | |
| Flow Rate (ml/min.) | | | | |
| Dielectric Material | — | | Glass | |
| Frequency (kHz) | — | | 24 | |
| Firing Power (W) | — | | 75 | |
| Reaction Time (min.) | — | | 10 | |
| HOW TO ESTIMATE | | | | |
| Dispersibility | (A) | (B) | (A) | (B) |
| in Water A and | Δ | | Δ | |
| Solvent B | | X | | ○ |
| Sedimentation Rate | 12.1 | 85.7 | 52.9 | 59.3 |
| Re-dispersibility | Δ | Δ | Δ | ○ |
| Cohesiveness | Δ | Δ | Δ | ○ |
| Kneadability | Δ | Δ | Δ | ○ |

How to treat typical powders and rare, monomer and additional gases as well as the results of estimation of these treatments have been set out in Tables 1~7.

As can be appreciated from the examples mentioned above, changing the gas used depending upon what type of powders are treated enables them to be improved in terms of dispersibility, re-dispersibility, cohesiveness (agglomeration) and kneadability, even when the dispersion system used is either of an aqueous type or of a solvent type. In other words, this means that by the application of this invention it is possible to disperse any powders which could by no means be dispersed conventionally, and shows that some powders can even be improved in terms of solubility; that is, their surfaces can be easily modified or denatured.

Using the liquid dielectric 20 for the electrodes 7, 8 and 9 makes it possible to easily enlarge the space for the discharge electrodes, and ensures low-cost manufacture. In addition, the additional use of a circulation type of cooler can place the temperatures of the discharge electrodes section under control even in extended, continuous operations, enabling stable discharge to be maintained and glow discharge to have much wider applications than ever before.

As can be appreciated from the 1st and 2nd aspects of this invention mentioned above, changing the gas used depending upon what type of powders are treated enables them to be improved in terms of dispersibility, re-dispersibility, cohesiveness (agglomeration) and kneadability, even when the dispersion system used is either of an aqueous type or of a solvent type.

According to the third aspect of this invention, it is possible to change the gas used depending upon what type of powders are to be treated, and it is also possible to obtain powders improved in terms of dispersibllity, re-dispersibility, cohesiveness (agglomeration) and kneadability, even when the dispersion system used is either of an aqueous type or of a solvent type.

What is claimed is:

1. A method for the plasma treatment of a powder comprising the steps of:
   providing a reaction chamber having a high-voltage electrode and a grounded electrode, said electrodes covered at least in part with a dielectric;
   generating a plasma at atmospheric pressure in said chamber by impressing a suitable voltage between said high voltage electrode and said grounding electrode; and,
   providing a powder in said reaction chamber whereby said powder is treated by said plasma thereby altering at least one of said powders' properties of dispersibility, re-dispersibility, cohesiveness, sedimentation resistance, binding capability or kneadability.

2. The method of claim 1 wherein a solvent gas is fed into said reaction chamber.

3. The method of claim 1 wherein a surfactant-containing solution aerosol is fed into said reaction chamber.

4. The method of claim 1 wherein said dielectric is solid.

5. The method of claim 4 wherein said liquid is an insulating oil.

6. The method of claim 1 wherein said dielectric is liquid.

7. The method of claim 1 wherein said dielectric is a combination of liquid and solid.

8. An apparatus for treating a powder with a plasma, comprising:
   reactor vessel means having an upper fluidizing gas exhaust means, and a lower fluidizing gas inlet means;
   gas delivery means for introducing a fluidizing gas into said reactor vessel means through said lower fluidizing gas inlet means, said fluidizing gas agitating said powder to be treated; and,
   atmospheric plasma generating means housed within said reactor vessel means, comprising first and second metal electrodes covered at least in part with a dielectric comprising a solid, liquid or combination thereof, whereby a plasma is generated at atmospheric pressure when an energizing voltage is impressed between said first and second metal electrodes, said plasma providing said powder with an altered surface characteristic.

9. The apparatus of claim 8 wherein said dielectric is solid.

10. The method of claim 8 wherein said dielectric is liquid.

11. The method of claim 8 wherein said dielectric is a combination of liquid and solid.

12. A method for the plasma treatment of a powder comprising the steps of:
   providing a reaction chamber having a high-voltage electrode and a grounded electrode, said electrodes covered at least in part with a dielectric;
   generating a plasma at atmospheric pressure in said chamber by impressing a high voltage in the range of 1–10 kilovolts at 20–30 KHz between said high voltage electrode and said grounding electrode; and,
   providing a powder in said reaction chamber whereby said powder is treated by said plasma thereby altering at least one of said powders properties of dispersibility, redispersibility, cohesiveness, sedimentation resistance, binding capability or kneadability.

* * * * *

UNITED STATES PATENT AND TRADEMARK OFFICE
CERTIFICATE OF CORRECTION

PATENT NO. : 5,399,832
DATED : March 21, 1995
INVENTOR(S) : TATSUZO TANISAKI ET AL.

It is certified that error appears in the above-indentified patent and that said Letters Patent is hereby corrected as shown below: Title page:

Item [57],

On the cover page, in the Abstract, line 14 of the Abstract,

"ape" should read —are—.

Signed and Sealed this

Twelfth Day of September, 1995

Attest:

BRUCE LEHMAN

Attesting Officer        Commissioner of Patents and Trademarks